United States Patent
Frutschi et al.

(10) Patent No.: US 6,886,344 B2
(45) Date of Patent: May 3, 2005

(54) METHOD FOR THE OPERATION OF A POWER PLANT

(75) Inventors: Hans Ulrich Frutschi, Riniken (CH);
Timothy Griffin, Ennetbaden (CH);
Hans Wettstein, Fislisbach (CH);
Dieter Winkler, Lauchringen (DE)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 10/808,487

(22) Filed: Mar. 25, 2004

(65) Prior Publication Data

US 2004/0177617 A1 Sep. 16, 2004

Related U.S. Application Data

(63) Continuation of application No. PCT/IB02/03955, filed on Sep. 24, 2002.

(30) Foreign Application Priority Data

Sep. 25, 2001 (DE) .......................................... 101 47 476

(51) Int. Cl.$^7$ ................................................ F02C 1/08
(52) U.S. Cl. ........................................ 60/772; 60/39.52
(58) Field of Search ............................ 60/39.12, 39.52, 60/772, 780, 781

(56) References Cited

U.S. PATENT DOCUMENTS

| | | | |
|---|---|---|---|
| 2001/0015061 A1 | * | 8/2001 | Viteri et al. ............. 60/39.161 |
| 2002/0174659 A1 | * | 11/2002 | Viteri et al. ................... 60/780 |
| 2004/0065088 A1 | * | 4/2004 | Viteri et al. ................... 60/772 |

* cited by examiner

Primary Examiner—Louis J. Casaregola
(74) Attorney, Agent, or Firm—Cermak & Kenealy LLP; Adam J. Cermak

(57) ABSTRACT

In a method for the operation of a power plant with a closed or quasi-closed cycle, the power plant substantially comprises at least one compressor unit (1) or a pump, at least one combustion chamber (2), at least one turbine (3) and at least one heat sink (4). In the combustion chamber (2), a fuel mass flow (14) reacts with at least one oxygen flow (12), the excess combustion products which are formed as a result ($CO_2$, $H_2O$) are removed from the cycle at a suitable location (5, 6), and the oxygen stream (12) fed to the combustion chamber is obtained by means of an air fractionation installation (11). Means (9) for coarse fractionation of the supplied air (8) are connected upstream of the air fractionation installation (11) in order to supply oxygen-enriched air (10) to the air fractionation installation (11).

10 Claims, 1 Drawing Sheet

METHOD FOR THE OPERATION OF A POWER PLANT

This application is a continuation of and claims priority under 35 U.S.C. §120 to International application number PCT/IB02/03955, filed 24 Sep. 2002, and claims priority under 35 U.S.C. §119 to German application number 101 47 476.8, filed 25 Sep. 2001, the entireties of both of which are incorporated by reference herein.

BACKGROUND OF THE INVENTION

1. Field of the Invention

The invention is based on a method for the operation of a power plant in accordance with the preamble of the independent claim.

2. Discussion of Background

Power plant installations which burn carbon-containing fuels as compressed atmospheric air is supplied are generally known. However, the combustion gases produced during the combustion, such as carbon dioxide ($CO_2$) and nitrogen oxides, present a multilayered problem and, not least, are implicated in global warming.

EP 0 953 748 A1 has disclosed a power plant with a closed or quasi-closed cycle. The cycle is operated with a $CO_2$-containing medium with internal combustion of a fuel and the oxygen required for this purpose. Excess $CO_2$ is removed from the cycle and introduced into a condensation installation, and the condensed $CO_2$ can then be disposed of in an environmentally friendly way. The use of a closed or quasi-closed cycle with the addition of pure oxygen moreover prevents atmospheric nitrogen from entering the flame, and consequently no nitrogen oxides, or at most only low levels of nitrogen oxides, are formed.

However, the design of the cycle means that inert gases which are entrained with the fuel or oxygen accumulate in the process to well above the starting concentration and, as a result of a shift in the thermodynamic properties of the working medium, may have a considerable adverse effect on the process efficiency. The composition of the fuel used cannot be influenced by the process described, but the oxygen fed to the process should be as pure as possible, in order to minimize the levels of inert gases.

Hitherto, it has only been possible to produce high-purity oxygen in the quantities required by cryogenic means. In this context, the high costs of the air fractionation installation, which places a question mark over economic operation of power plants with a closed or quasi-closed cycle, are mainly caused by the low concentration of oxygen in the ambient air and the resulting large mass and volumetric flows which are required in the air fractionation installation.

SUMMARY OF THE INVENTION

Accordingly, one object of the invention is to provide a novel method for the operation of a power plant of the type described in the introduction in which high-purity oxygen is made available at low cost.

According to the invention, this is achieved by the features of the independent claim.

Therefore, the core idea of the invention is for means for coarse fractionation of the supplied air to be connected upstream of the air fractionation installation.

The advantages of the invention consist, inter alia, in the fact that after it has left the coarse fractionation installation, the oxygen-enriched air, of which there is consequently a reduced mass flow, is passed into the air fractionation installation, where it is processed. The upstream coarse fractionation installation means that the conventional air fractionation installation can be made very much smaller and less expensive.

It has proven advantageous for the coarse fractionation installation to be operated using a membrane process or an adsorption process, for example a vacuum swing adsorption process. In the former case, the permeated air constituent may be either oxygen or nitrogen, depending on the type of membrane.

Further advantageous configurations of the invention will emerge from the subclaims.

BRIEF DESCRIPTION OF THE DRAWING

A more complete appreciation of the invention and many of the attendant advantages thereof will be readily obtained as the same becomes better understood by reference to the following detailed description when considered in connection with accompanying drawing, wherein features which are not essential to gaining a direct understanding of the invention have been omitted, the direction of flow of the media is indicated by arrows, and wherein.

DESCRIPTION OF THE PREFERRED EMBODIMENT

Figure 1:
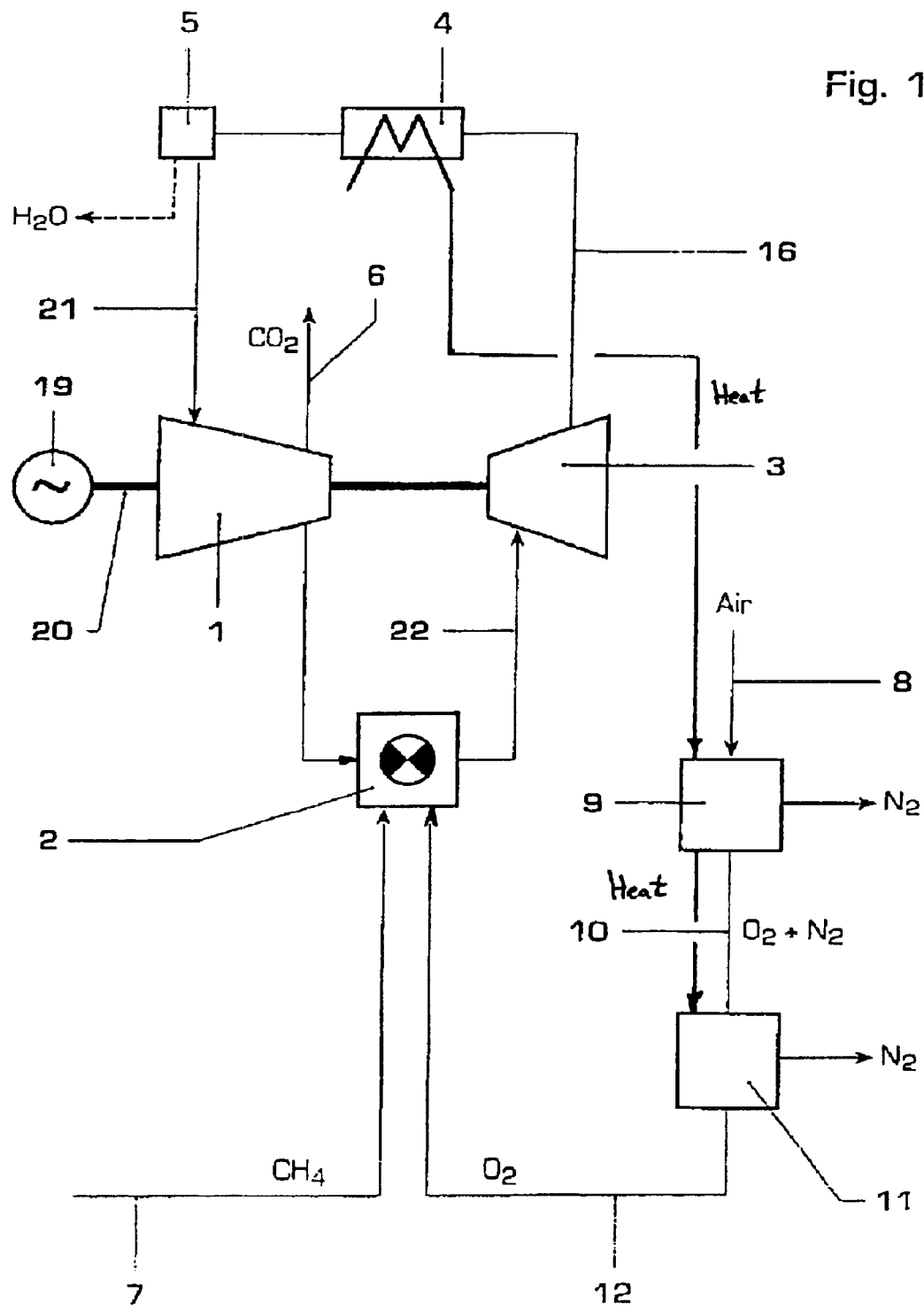
FIG. 1 shows a circuit of gas turbine process with a closed cycle.

Referring now to the drawings, wherein like reference numerals designate identical or corresponding parts, FIG. 1, which is the only figure, shows a gas turbine with a closed or at least quasi-closed, i.e. largely closed, cycle. This gas turbine or gas turbine assembly comprises, in terms of its equipment, a compressor unit 1, a generator 19 which is coupled to this compressor 1, a turbine 3 which is coupled to the compressor 1, and a combustion chamber 2 which acts between the compressor 1 and turbine 3. The turbomachines 1 and 3 can be coupled by means of a common shaft 20. The compressor may also be equipped with an intercooler (not shown) or with means for isothermal cooling.

The cycle also comprises a cooler and/or waste heat utilizer 4, a water separator 5 and a $CO_2$ removal location 6. The $CO_2$ which is removed via the $CO_2$ removal location 6 can, for example, be condensed by means of a condensation installation (not shown) and then disposed of in an environmentally friendly way. A cycle medium 21, for the most part comprising $CO_2$ and optionally $H_2O$, is compressed in the compressor 1 and fed to the combustion chamber 2. Furthermore, a fuel mass flow 7, in this case, for example, natural gas or methane $CH_4$, and an oxygen stream 12 are fed to the combustion chamber 2, where they are burnt. The hot gas 22 which is formed in the process and in this case substantially comprises the components $CO_2$ and $H_2O$, as well as any inert gases which may have been supplied with the oxygen or the fuel, is fed to the turbine 3, where it is expanded so as to perform work. The turbine outlet stream is fed to the cooler and/or waste heat utilizer 4 via a line 16, where it is cooled. The water which precipitates as a result of the cooling is separated out via the water separator 5. The remaining cycle medium 21, mostly made up of $CO_2$, is then fed back to the compressor 1. Since the components $CO_2$ and $H_2O$ which are formed as a result of the combustion are removed continuously, a cycle with a substantially constant composition of the working medium is formed.

The cycle medium can also be liquefied by dissipation of heat, in which case a pump can be used instead of the compressor.

By way of example, a cryogenic air fractionation installation 11 is used to produce the oxygen stream 12. The cryogenic separation of mixtures, such as air, in order to obtain oxygen ($O_2$) and nitrogen ($N_2$), is known. In this context, reference may be made, for example, to the Linde two-column process. However, air fractionation installations entail high costs, which are dependent primarily on the mass or volumetric flows which are to pass through them. Therefore, according to the invention a coarse fractionation installation 9, which operates according to a simple membrane principle, of single-stage or multistage design and in which, by way of example, polymer membranes may be used, is connected upstream of the cryogenic air fractionation installation 11. In the coarse fractionation installation, the air 8 which is drawn in is enriched with oxygen by nitrogen being separated out. Depending on the type of membrane, the permeated air constituent may be either oxygen or nitrogen. Any required temperature control for the membrane module can be achieved by thermal integration with the waste heat utilizer 4 or the cryogenic air fractionation installation 11. On leaving the coarse fractionation installation, the mass flow of air 10, which has been enriched to oxygen levels of at least 40 vol % and has therefore been reduced in magnitude by at least 50%, is passed into the cryogenic air fractionation installation, which can consequently be made very much smaller and less expensive than if the upstream coarse fractionation installation 9 were not present.

Of course, the invention is not restricted to the exemplary embodiment which has been shown and described.

Obviously, numerous modifications and variations of the present invention are possible in light of the above teachings. It is therefore to be understood that within the scope of the appended claims, the invention may be practiced otherwise than as specifically described herein.

List of Designations

1 Compressor
2 Combustion chamber
3 Turbine
4 Cooler and/or waste heat utilizer
5 Water separator
6 $CO_2$ removal location
7 Fuel mass flow
8 Air supply
9 Coarse fractionation installation
10 Reduced mass flow of air
11 Cryogenic air fractionation installation
12 Oxygen stream
16 Line
19 Generator
20 Common shaft
21 Cycle medium
22 Hot gas

What is claimed is:

1. A method for the operation of a power plant with a closed or quasi-closed cycle, the power plant comprising at least one compressor unit or a pump, at least one combustion chamber, and at least one turbine, the method comprising:

connecting means for coarse fractionation of air upstream of an air fractionation installation to supply oxygen-enriched air to the air fractionation installation;

obtaining at least one oxygen flow with the air fractionation installation;

reacting a fuel mass flow with said at least one oxygen flow in the at least one combustion chamber to form a hot gas;

expanding said hot gas in a work-performing manner in the at least one turbine to produce excess combustion products; and removing the excess combustion products from the cycle.

2. The method for the operation of a power plant as claimed in claim 1, wherein the air fractionation installation comprises a cryogenic air fractionation installation.

3. The method for the operation of a power plant as claimed in claim 1, wherein the means for the coarse fractionation of air comprises an at least single-stage membrane device.

4. The method for the operation of a power plant as claimed in claim 1, wherein the means for coarse fractionation of air comprises a vacuum swing adsorption device.

5. The method for the operation of a power plant as claimed in claim 1, further comprising:

increasing the oxygen content of air supplied to the air fractionation installation to at least 40 per cent by volume with the means for coarse fractionation of air.

6. The method for the operation of a power plant as claimed in claim 3, wherein a permeated air component for said at least single-stage membrane device is oxygen.

7. The method for the operation of a power plant as claimed in claim 3, wherein a permeated air component for said at least single-stage membrane device is nitrogen.

8. The method for the operation of a power plant as claimed in claim 3, wherein the power plant includes a waste heat utilizer of the gas turbine, and further comprising:

providing heat for said at least single-stage membrane device from the waste heat utilizer.

9. The method for the operation of a power plant as claimed in claim 3, further comprising:

providing refrigeration required for said at least single-stage membrane device from the air fractionation installation.

10. The method for the operation of a power plant as claimed in claim 1, wherein said excess combustion products comprise $CO_2$, $H_2O$, or both.

* * * * *